United States Patent
Zhao (10) Patent No.: US 7,353,253 B1
(45) Date of Patent: Apr. 1, 2008

(54) PEER-TO-PEER MESSAGING SYSTEM

(75) Inventor: Bin T. Zhao, San Jose, CA (US)

(73) Assignee: Webex Communicatons, Inc., San Jose, CA (US)

( * ) Notice: Subject to any disclaimer, the term of this patent is extended or adjusted under 35 U.S.C. 154(b) by 661 days.

(21) Appl. No.: 10/266,732

(22) Filed: Oct. 7, 2002

(51) Int. Cl.
*G06F 15/16* (2006.01)

(52) U.S. Cl. .................................................. 709/204

(58) Field of Classification Search .............. 709/203, 709/231, 237, 204
See application file for complete search history.

(56) References Cited

U.S. PATENT DOCUMENTS

| | | | |
|---|---|---|---|
| 6,119,147 A * | 9/2000 | Toomey et al. ............. | 709/204 |
| 6,604,129 B2 * | 8/2003 | Slutsman et al. ........... | 709/204 |
| 6,606,112 B1 * | 8/2003 | Falco ...................... | 348/14.12 |
| 6,606,644 B1 * | 8/2003 | Ford et al. ................. | 709/203 |
| 6,925,088 B1 * | 8/2005 | Moreaux .................... | 370/407 |
| 7,031,326 B1 * | 4/2006 | Shur et al. .................. | 370/401 |
| 2001/0012304 A1 * | 8/2001 | Agraharam et al. ........ | 370/487 |
| 2002/0065929 A1 * | 5/2002 | Kamentsky et al. ........ | 709/231 |
| 2003/0041165 A1 * | 2/2003 | Spencer et al. ............. | 709/233 |
| 2003/0050955 A1 * | 3/2003 | Eatough et al. ............. | 709/201 |
| 2003/0158959 A1 * | 8/2003 | Jayapalan et al. .......... | 709/237 |
| 2005/0180356 A1 * | 8/2005 | Gillies et al. ............... | 370/329 |

* cited by examiner

*Primary Examiner*—Jason Cardone
*Assistant Examiner*—Minh-Chau Nguyen
(74) *Attorney, Agent, or Firm*—Orrick Herrington & Sutcliffe LLP (57) ABSTRACT

A system is provided for peer-to-peer messaging. The system includes a first client machine which may transmit a sequence of messages related to a subject. The transmission of each message can be in the form of multicast delivery or reliable unicast delivery. At least one second client machine communicates with the first client machine. Each such second client machine may receive at least a portion of the sequence of messages transmitted in the multicast form of delivery from the first client machine, and determines if there is an interest in the subject of the sequence of messages. The second client machine may determine if any messages in the sequence have not been received if there is an interest, and can transmit a request for re-transmission to the first client machine. The request identifies any messages of the sequence that were not received so that such messages can be re-transmitted by the first client machine to the at least one second client machine in the form of reliable unicast delivery.

18 Claims, 4 Drawing Sheets

PEER-TO-PEER MESSAGING SYSTEM

TECHNICAL FIELD OF THE INVENTION

The present invention relates generally to computer networks and, more particularly, to peer-to-peer messaging systems.

BACKGROUND OF THE INVENTION

Distributed network applications often require an efficient and reliable real-time data communication system. Applications need to send and receive messages to other applications running on separate computers linked by a local area network. Such a messaging system should be able to handle a high volume of messages.

Various systems and techniques have been previously developed for data communication for distributed network applications. One such previously developed system is a "heavyweight" peer-to-peer messaging system. The heavyweight peer-to-peer messaging system employs two types of components. The first type of component is a messaging client library that is linked into every custom application that needs to send or receive messages. The second type of component is a messaging daemon that handles the network broadcasting of the messages. This messaging daemon needs to be running on every machine that is sending or receiving messages. Such daemon is a process that runs in the background (without a visible user interface) and performs a specified operation at predefined times or in response to certain events. In general, daemons are usually spawned automatically by a system and may either live forever or be regenerated at intervals.

Another previously developed messaging system employs a client-server architecture. Such a client-server system consists of multiple messaging clients communicating with one or more stand-alone messaging servers. The clients have messaging libraries linked into custom applications like in the peer-to-peer system described above. Each messaging server has a daemon resident thereon.

Both the heavyweight peer-to-peer and client-server messaging architectures suffer from numerous problems. For example, in the heavyweight peer-to-peer model, inter-process communication (IPC) calls between the messaging library and the messaging daemon are required for messaging, thereby comprising performance. This is in addition to the required network communication that is needed to broadcast the messages from a sending messaging daemon to one or more receiving messaging daemons. In the client-server model, performance is compromised because messages need to be sent to a messaging server before being broadcast to the receiving client machines.

In the heavyweight peer-to-peer model, reliability is an issued because the messaging daemon could be a potential failure point on every machine that needs to send and receive messages. If the messaging daemon fails or is accidentally stopped, none of the applications running on the machine will be able to send or receive messages. In the client-server model, the use of a single messaging server presents a single point of failure. Using one or more additional messaging servers alleviates this reliability issue, but increases overall costs.

In the heavyweight peer-to-peer model, a messaging daemon must be configured and initiated for each machine that is sending and receiving messages, thereby complicating the task of system configuration. In the client-server model, system configuration is complicated by the need to configure and maintain the messaging server machines and the daemons resident thereon.

In addition, many previously developed messaging solutions use the Transmission Control Protocol (TCP). TCP provides a unicast point-to-point transmission mechanism with message acknowledgement for reliable messaging. TCP is suitable when there is one sender and one recipient for any given message. However, to send a message from one machine to many others using the unicast mechanism is bandwidth intensive. For example, to send a message to five recipients with the unicast mechanism of TCP requires five separate transmissions of the same data.

SUMMARY OF THE INVENTION

The present invention provides systems and methods for a lightweight peer-to-peer messaging system. The messaging system does not use a messaging daemon in order for there to be communication between a plurality of client machines. Each client machine in the messaging system includes one or more applications, each of which has a messaging client library for communications with other machines. The messaging client library may implement a User Datagram Protocol (UDP) multicast protocol for sending out broadcast messages. If there are problems, then the same machine may send out a non-broadcast UDP protocol message. The proposed lightweight peer-to-peer messaging system includes a client application messaging library. The system does not include a separate messaging daemon or stand-alone messaging server. The simplicity of design improves upon reliability, performance, and configuration ease.

According to one embodiment of the present invention, a system is provided for peer-to-peer messaging. The system includes a first client machine which may transmit a sequence of messages related to a subject. The transmission of each message can be in the form of multicast delivery or reliable unicast delivery. At least one second client machine communicates with the first client machine. Each such second client machine may receive at least a portion of the sequence of messages transmitted in the multicast form of delivery from the first client machine, and determines if there is an interest in the subject of the sequence of messages. The second client machine may determine if any messages in the sequence have not been received if there is an interest, and can transmit a request for re-transmission to the first client machine. The request identifies any messages of the sequence that were not received so that such messages can be re-transmitted by the first client machine to the at least one second client machine in the form of reliable unicast delivery.

According to another embodiment of the present invention, a method is provided for peer-to-peer messaging performed on a first client machine. The method includes the following: transmitting a sequence of messages in multicast form of delivery to a plurality of second client machines, the sequence of messages related to a subject, and wherein at least a portion of the plurality of second client machines subscribe to the subject; receiving a request for re-transmission from at least one second client machine, the request for re-transmission specifying at least one message of the sequence which was not received by the at least one second client machine; and re-transmitting the specified at least one message of the sequence in reliable unicast form of delivery to the at least one second client machine.

Important technical advantages of the present invention are readily apparent to one skilled in the art from the following figures, descriptions, and claims.

BRIEF DESCRIPTION OF THE DRAWINGS

For a more complete understanding of the present invention, for further features and advantages, applicants now make the following description, taken in conjunction with the accompanying drawings, in which.

DETAILED DESCRIPTION OF THE PREFERRED EMBODIMENTS

Turning first to the nomenclature of the specification, the detailed description which follows is represented largely in terms of processes and symbolic representations of operations performed by conventional computer components, such as a local or remote central processing unit (CPU), processor, server, or other suitable processing device associated with a general purpose or specialized computer system, memory storage devices for the processing device, and connected local or remote pixel-oriented display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer system are often referred to in terms such as adding, comparing, moving, searching, or the like, which are often associated with manual operations performed by a human operator. It must be understood that no involvement of the human operator may be necessary, or even desirable, in the present invention. Some of the operations described herein are machine operations performed in conjunction with the human operator or user that interacts with the computer or system.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus to perform one or more of the method steps described herein by way of dedicated computer systems with hard-wired logic or programs stored in non-volatile memory, such as read-only memory (ROM).

Overview

According to embodiments of the present invention, systems and methods are provided for peer-to-peer messaging between and among a number of client computers. With this peer-to-peer messaging, no messaging daemon process or stand-alone messaging server is required. Instead, for each client computer having one or more applications running thereon, a messaging client library may be linked into each application that needs to send and receive messages between client computers. In one embodiment, the messaging client library may support or utilize a specialized form of User Datagram Protocol (UDP) to provide for both efficient and reliable delivery of messages from the linked-in application to all other messaging client computers. This peer-to-peer messaging is able to handle a high volume of messages (e.g., up to 800 messages per second).

System for Peer-to-Peer Messaging

Figure 1:
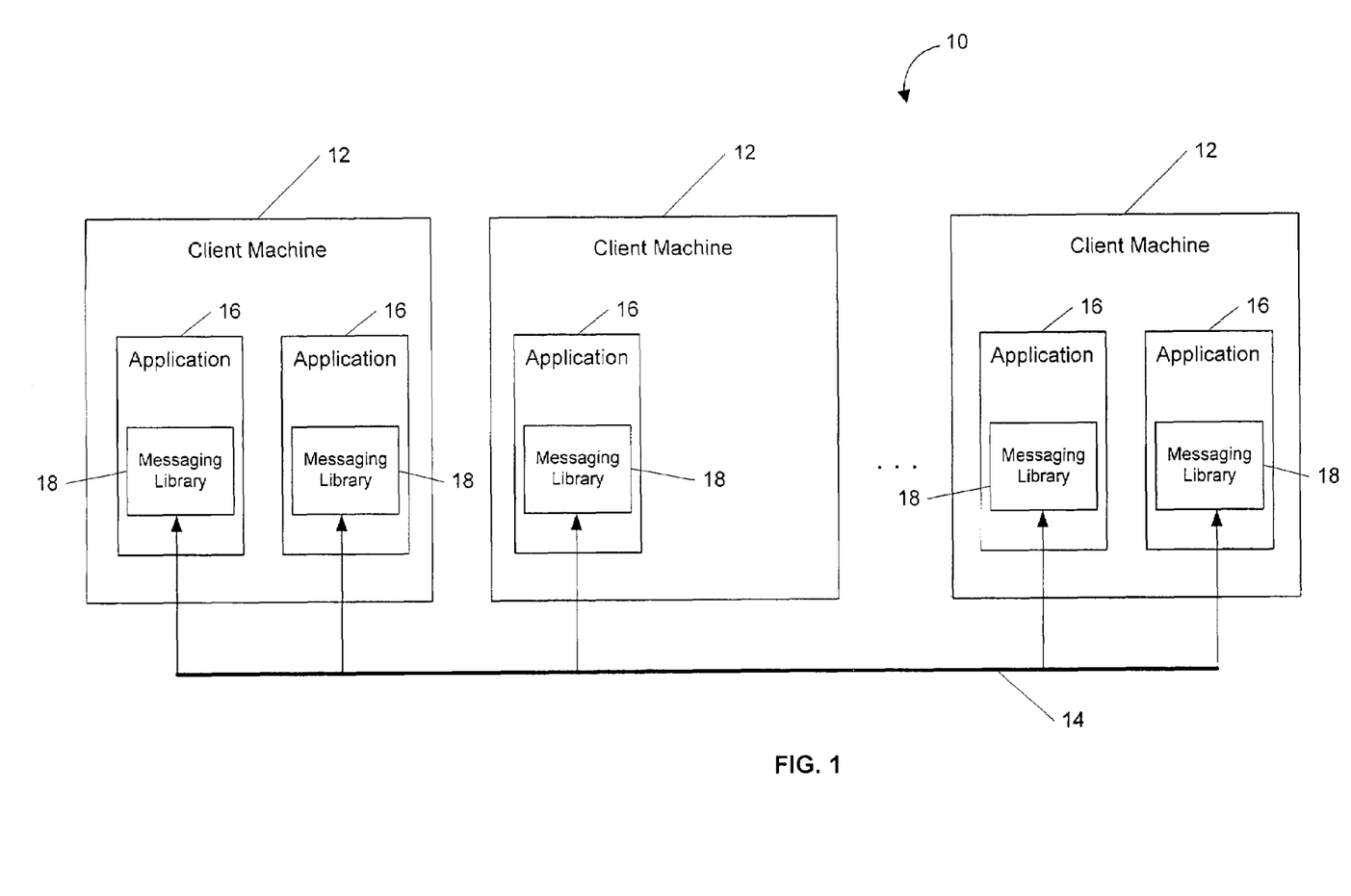
FIG. 1 illustrates a peer-to-peer messaging system, according to an embodiment of the present invention.

Referring now to the drawings, FIG. 1 illustrates a system 10 for peer-to-peer messaging, according to an embodiment of the present invention. As depicted, system 10 includes a plurality of client machines 12 which may communicate over a communication link 14.

Each client machine 12 can be any suitable computer such as, for example, a personal computer (PC), main-frame, a file server, a workstation, or other suitable data processing facility supported by memory (either internal or external), and operating under the control of any suitable operating system (OS), such as MS-DOS, MacINTOSH OS, WINDOWS NT, WINDOWS 95, WINDOWS 2000, WINDOWS NT, SOLARIS, OS/2, UNIX, LINUX, XENIX, HP-UX, and the like.

On each client machine 12, one or more software applications 16 may run. Each application 16 may interact with an operating system of the client machine 12. These applications 16 may support numerous services or functions such as, for example, document sharing, accounting, word processing, application sharing, file transfer, remote control, voiceover Internet Protocol (IP), user authentication, meeting scheduling, address book, files and folders, invoices, billing, scheduling, telephone conferencing, authentication, database management, etc. These applications 16 may also support a website or web server for distribution of web pages and access to back-end applications. Each application 16 can be a network application which may require efficient and reliable real-time data communication between client machines 12 during operation of system 10.

Each application 16 may include a client messaging library 18. In one embodiment, the applications 16 make application programming interface (API) calls to the linked-in messaging libraries 18. A messaging library 18, according to an embodiment of the present invention, may support peer-to-peer messaging within system 10 without use of a daemon application or a separate stand-alone messaging server connecting all of client machines 12. A messaging library 18 is able to communicate or exchange messages between its corresponding application 16 and other applications 16 residing on either the same client machine 12 or other client machines 12. In one embodiment, as depicted, a separate messaging library 18 is provided for each application 16. In other embodiments, one messaging library 18 may be provided for multiple applications 16, or multiple messaging libraries 18 may be provided for a single application 16. The messaging library 18 includes a number of modules or components which enable it to exchange messages with other messaging libraries 18.

The messaging library 18 may utilize, support, or implement a specialized form of User Datagram Protocol (UDP). UDP is a communications protocol for Internet network layer, transport layer, and session layer. Like Transmission Control Protocol (TCP), UDP is used with Internet Protocol (IP). Unlike TCP, the standard form of UDP is connectionless—i.e., it provides for exchange of messages (or datagrams) without acknowledgements or guaranteed delivery. This makes UDP a relatively low-overhead protocol for delivering messages. At the same time, however, the standard form of UDP does not guarantee reliable communication; an application itself must process any errors and check for reliable delivery. The standard form of UDP has a "multicast" form of delivery for sending a single message to a select group of recipients. Standard UDP also has a "unicast" form of delivery for sending control messages between a single sender and a single recipient. In addition to multicast and unicast forms of delivery, the specialized form of UDP according to embodiments of the present invention also provides for a reliable unicast form of delivery. With the reliable unicast delivery form, message acknowledgement is provided for reliable delivery.

Communication link 14 can be a communication line in copper wire, fiber-optic cable, or other suitable medium, that is part of a local area network (LAN), wide area network (WAN), or other network. For example, in some embodiments communication link 14 can be a dedicated T1 or T3 or optical carrier-class link, such as one employing the well-known SONET standard and OC-48 or OC-192 framing. One of ordinary skill in the art will readily recognize that many other equivalent network standards, including non-optical standards, may be employed for implementing communication link 14. Communication link 14 can include one or more lines or buses for communicating data between the various client machines. These can be physical lines such as copper wire or optical fiber, along with suitable routers, amplifiers, and other circuitry necessary for transmission, delivery and protocol. In one embodiment, a suitable bridge is connected to communication link 14, thus enabling the client machines 12 of system 10 to communicate with an outside network. This bridge, for example, can communicate over the Internet with client computers located at another location.

In one embodiment, one or more groups are formed from the client machines 12 or the applications 16 running thereon. Each group may be defined or characterized by a particular message "topic" or "subject" (e.g., meetingdomain.meetingzone.mzm. serverid) for which all members of the group should desirably receive data or information. Thus, any message relating to a particular subject should be sent to and received by the respective group of client machines 12 or applications 16. Each group can include up to all of the applications 14 or client machines 12. Applications 14 or client machines 12 which are members of a group may be deemed to "subscribe" to the particular subject which defines the group.

In operation, in one embodiment, the UDP multicast form of delivery is used to send messages from a sending client machine 12 to a select group of receiving client machines 12. If, for whatever reason, some of the multicast messages do not make it to one or more intended receiving client machines, the messaging client library may utilize the UDP reliable unicast form of delivery to resend the messages. In particular, the UDP multicast form of delivery does not guarantee that messages will be received in the same order they are sent out. Therefore for each sender in every subject, each message sent is given an incremental sequence number. If an intended client machine 12 receives an unordered message, it will send a request for the one or more missing messages to the sending client machine via UDP reliable unicast delivery. The sending client machine 12 will then re-send the missing messages via UDP reliable unicast delivery.

The lightweight peer-to-peer messaging, in one embodiment of the present invention, is able to handle a high volume of messages (e.g., up to 800 messages per second). This peer-to-peer messaging does not require a separate messaging daemon or stand-alone messaging server. The simplicity of this design improves reliability, performance, and configuration ease in system 10.

With the peer-to-peer messaging system 10, reliability is improved since there is no messaging daemon on each client machine 12 that can fail or be accidentally stopped as in the previously developed heavyweight peer-to-peer messaging systems. Also, there are no messaging server machines that can fail or be disconnected as with previously developed client-server models for messaging.

Performance is improved because client machines 12 in system 10 broadcast their messages directly to other client machines 12. In system 10, no inter-process communication between messaging client applications and a messaging daemon is necessary as in the previously developed heavyweight peer-to-peer model. Nor is there any delay caused by routing all messages through a separate messaging server, which then broadcasts the messages to the other clients computer, as with the previously developed client-server model. Furthermore, the use of the UDP multicast form of delivery in lightweight peer-to-peer messaging system 10 improves bandwidth consumption significantly. For example, to send a message to five recipients with TCP/IP unicast, as employed by previously developed systems, requires five transmissions of the same data. Using the UDP multicast form of delivery requires ⅕ the same bandwidth since the data is only transmitted once for all five recipients.

Configuration of peer-to-peer messaging system 10 is simpler since it is not necessary to set up a messaging daemon on each client machine like in the previously developed heavyweight peer-to-peer model. Furthermore, there are no messaging server machines to configure and maintain as in the previously developed client-server model.

Exemplary Environment

Figure 2:
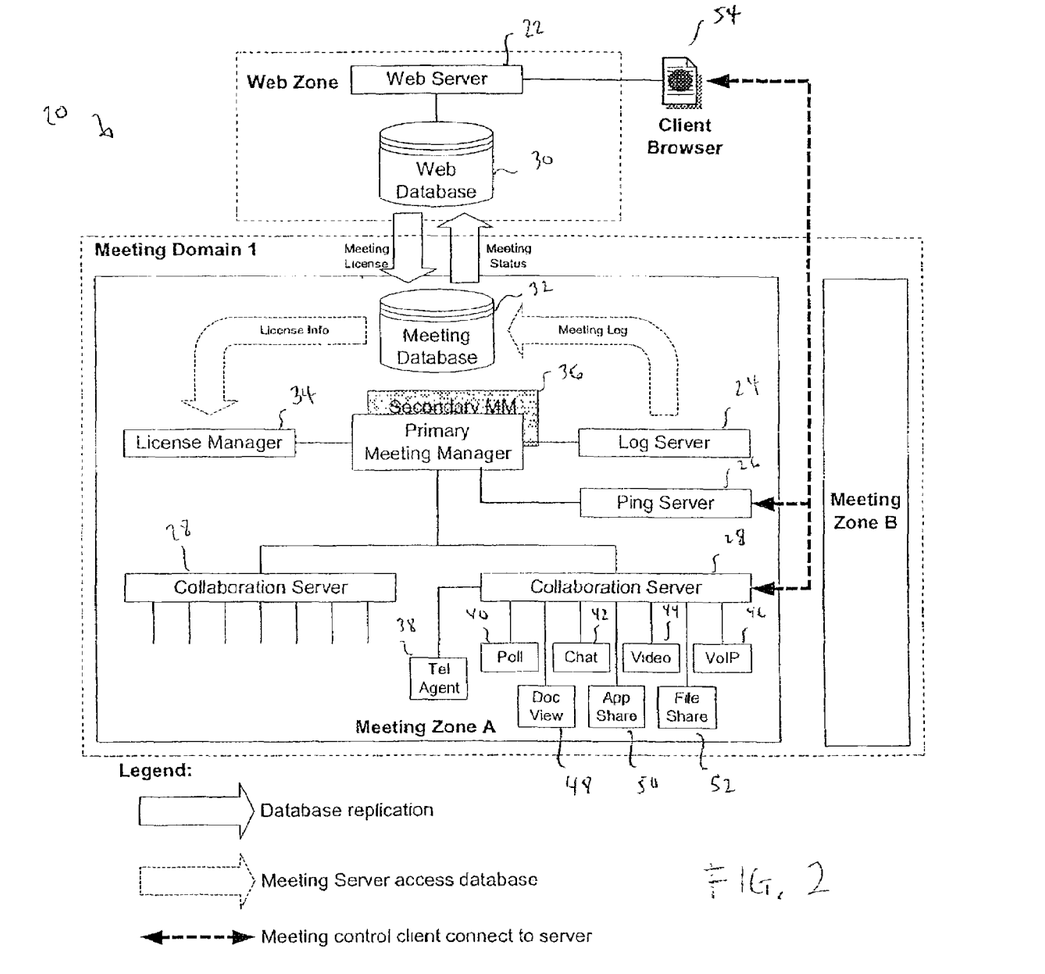
FIG. 2 illustrates a logical view of an exemplary computer system environment in which a lightweight peer-to-peer messaging system can be employed, according to an embodiment of the present invention.

FIG. 2 illustrates a logical view of an exemplary computer system environment 20 in which a system 10 of the present invention may be employed. In this computer system environment 20, a number of server computers and databases may be in communication to provide for collaborative meeting or computing. The details for such can be found in U.S. application Ser. No. 09/751,424 entitled "Distributed Network System Architecture for Collaborative Computing," filed on Dec. 29, 2000, assigned to the same assignee and incorporated by reference herein in its entirety.

Referring to FIG. 2, in environment 20, a number of processing facilities, including, for example, one or more of a web server 22, a log server 24, a ping server 26, and a collaboration server 28, license manager 34, primary and secondary meeting managers 36, application servers (e.g. telephone agent 38, poll 40, chat 42, video 44, voice over IP 46, document view 48, application share 50, and file share 52) may be integrated with a number of data storage facilities, such as, for example, a web database 30 and a meeting database 32 to implement a system for collaborative meetings over the Internet. As depicted, the processing and database facilities of environment 20 are divided into a web zone and one or more meeting zones for interaction with one or more client browsers 54.

A web zone can be one or more server machines that share a common web database 30. In the web zone, web server 22 may have a unique IP address (which can be associated with a particular website) and responds to Hyper-Text Transport Protocol (HTTP) requests coming to that IP address from client browser 54. Web server 22 serves or supports web pages. Web database 30 may contain static information for the website including site specific data, web pages, and user data.

A meeting zone is a collection of servers and databases that help perform all the synchronous activity of an on-line collaborative meeting. In the meeting zone, the meeting managers 36 may be servers which communicate with other servers in the meeting zone (e.g., collaboration server 28, log server 24, ping server 26, etc.) to keep track of the on-line meetings in progress in the meeting zone. Meeting managers 36 may log meeting information into meeting database 32. Ping server 26 works with meeting managers 36 to determine a collaboration server 28 that is most suitable for hosting a particular meeting; it may act as a load balancer for the meeting service. Collaboration servers 28 may handle all real time control and communication during an on-line collaborative meeting. The application servers (e.g., servers 38 through 52) may support specific features that may be available as part of an on-line collaborative meeting, such as, for example, telephony, polling, chatting, video, voice over IP, document review, application sharing, and file sharing. License manager 34 may keep track of and enforce licensing conditions and charges for the meeting. The log server 24 keeps track of meeting logs. Meeting database 32 can maintain at least a portion of the transient data required to conduct and keep track of on-line meetings. This data would include, for example, site and user information that would be required to establish and conduct a meeting.

Each of the processing and database facilities in environment 20 can be implemented on one or more client machines 12, which run appropriate applications to support the desired functionality. These applications may need to exchange information and data during operation to support the collaborative meeting. The information is exchanged via message packets carried over appropriate communication links between the various processing and database facilities. In one embodiment, client machines 12 can be employed for any one or more, up to all, of web server 22, primary and secondary meeting managers 36, license manager 34, log server 24, ping server 26, collaboration server 28, and various application servers. Each of these servers may thus include a respective messaging library 18 for communicating with the each other using the peer-to-peer messaging technique according to embodiments of the present invention. Furthermore, the client machines 12 in one meeting zone (e.g., Meeting Zone A) may communicate with client machines in another meeting zone (e.g., Meeting Zone B) using the peer-to-peer messaging technique.

Messaging Library

Figure 3:
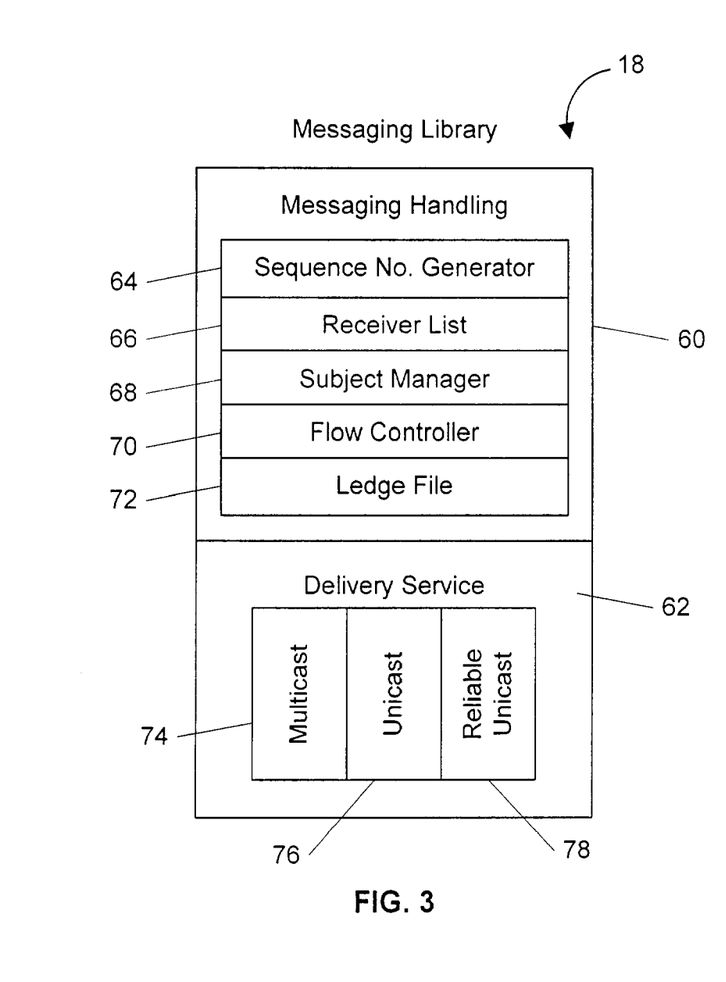
FIG. 3 illustrates an exemplary messaging library, according to an embodiment of the present invention.

FIG. 3 illustrates a messaging library 18, according to an embodiment of the present invention. Messaging library 18 may be associated with or integrated into an application 16 residing or running on a client machine 12. Messaging library 18 generally functions to support the exchange or transfer of messages containing data or information with other messaging libraries 18 associated with respective applications 16 during operation of system 10 in the peer-to-peer messaging technique, according to embodiments of the present invention. These other messaging libraries 18 may be running on the same or separate client machine 12 linked by communication link 14.

Messaging library 18 serves as a transport layer for linking data between the associated application 16 and a network layer. The transport layer provides multiplexing/ demultiplexing service in order to pass data between the network layer and the respective application 16. The messaging library 18 does not include any messaging daemon, nor does it require a separate server to function. As depicted, messaging library 18 includes a message handling component 60 and a delivery service component 62.

Message handling component 60 general functions to coordinate or manage the handling of messages which may be transmitted from or received by messaging library 18 for the associated one or more applications 16. Message handling component 60 may include a number of modules for supporting or providing this message handling functionality. These include a sequence number generator 64, a receiver list 66, a subject manager 68, a flow control 70, and a ledge file 72. Each of these modules 64 through 72 may comprise one or more computer programs, processes, or routines which, when executed, perform the functionality described herein.

Sequence number generator 64 generally functions to generate individual sequence numbers for different messages that are output from messaging library 18. These sequence numbers may be used as a check to verify that all messages which are intended to be received by a particular client machine 12 have indeed been received. Receiver list 66 generally functions to keep track of which clients machines 12 are listening to a particular sequence of messages which may be related to a particular topic or subject. The subject manager 68 generally functions to manage the subjects to which the application 16 (or client machine 12) may subscribe. Flow controller 70 controls the flow of data or information through messaging library 18. It coordinates so that data/information from various applications 16 can reach the proper recipient and also be distributed to the proper components. Ledge file 72 generally functions to act as a buffer which tracks the information that is transmitted/ received. In case of a computer or system crash, the information in ledge file 72 can be used for data/information recovery.

Delivery service component 62 generally functions to provide or support the delivery of messages from application 16 or client computer 12. In one embodiment, this delivery can be accomplished with the specialized form of User Datagram Protocol (UDP) messaging of the present invention. UDP is a connectionless protocol which runs on top of Internet protocol (IP) networks. The standard form of UDP/IP provides very few error recovery services, instead offering a direct way to send and receive datagrams or messages over an UDP network comprising an interconnected set of computers. UDP is "connectionless" in the sense that a sending machine (or host) can send a message without establishing a connection with a receiving machine (or recipient). That is, there is no handshaking between the host and the recipient before sending a message. The host simply puts the message onto the network with the destination address and hopes that it arrives.

UDP allows an application 16 to send messages to other applications 16 with a minimum of protocol mechanism. UDP sends messages without many formal preliminaries. Thus, UDP offers a relatively fast and efficient way of transporting messages within system 10. UDP takes messages from an application process, attaches source and destination port number fields from a multiplexing/demultiplexing service, adds two other fields, and passes the resulting "segment" to the network layer. The network layer encapsulates a segment into an IP datagram or message and then makes a best-effort attempt to deliver the segment to the intended recipient(s). If the segment arrives at the recipient, UDP uses the port numbers in the IP source and destination addresses to deliver the data in the segment to the correct application process. Furthermore, since UDP is connectionless, it does not need to maintain a connection state nor does it need to track any of the parameters for a connection. UDP only has an overhead of eight bytes. The speed at which UDP sends data is only constrained by the rate at which the application 16 generates data/information, the capabilities of the source (e.g., CPU, clock rate, etc.) and the access bandwidth to the communication link 14.

In the specialized form of UDP according to embodiments of the present invention, delivery service component 62 supports three different forms of message delivery: multicast, unicast, and reliable unicast. In multicast delivery, a message is sent to a select group of receiving client machines 12 on the communication link 14. Each of these receiving machines may look at the message and determine whether or not it has any interest in that message. In unicast delivery, a message is directed to a single, specific receiving machine. In reliable unicast delivery, a message is directed to a specific receiving machine and a sequence/acknowledgement procedure is used to ensure that the message is indeed received by the intended recipient.

As depicted, delivery service component 62 comprises separate modules for the various forms of delivery: multicast module 74, unicast module 76, and reliable unicast module 78. Multicast module 74 is used to sent out messages to one or more groups. Unicast module 76 is used for purposes such as, for example, monitoring information. Reliable unicast module 78 is used to recover lost messages and track a receiver list. Each of these modules 74 through 78 may comprise one or more computer programs, processes, or routines which, when executed, perform the functionality described herein.

Message

Figure 4:
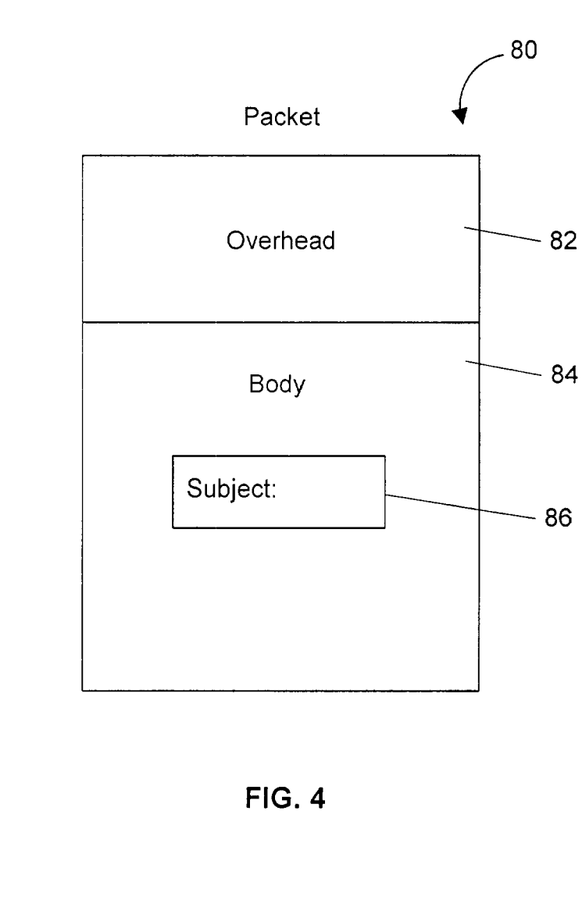
FIG. 4 illustrates an exemplary message, according to an embodiment of the present invention.

FIG. 4 illustrates a message 80 for the specialized form of UDP, according to an embodiment of the present invention. As depicted, this message 80 comprises an overhead component 82 and a body component 84. Overhead component 82 in one embodiment may comprise 8 bytes of information of overhead information. This overhead information, which can be used for communicating the message between a sending and one or more receiving client machines 12, may specify, for example, a source port, a destination port, a length of the packet, and a checksum. The body component 84 of the message 80 contains data or content that is to be delivered between applications. The body component 84 may include a subject line 86. The subject line 86 may specify a subject or topic of the message. Each client machine 12 may "subscribe" to certain subjects of interest. The client machine 12 may review messages delivered in multicast in order to view the specified subjects and determine whether or not it subscribes to the particular subject. If it does not subscribe to such subject, it will discard the message. Thus, a client machine 12 will only process messages that are related to a subject for which the machine has subscribed.

Method for Peer-to-Peer Messaging

Figure 5:
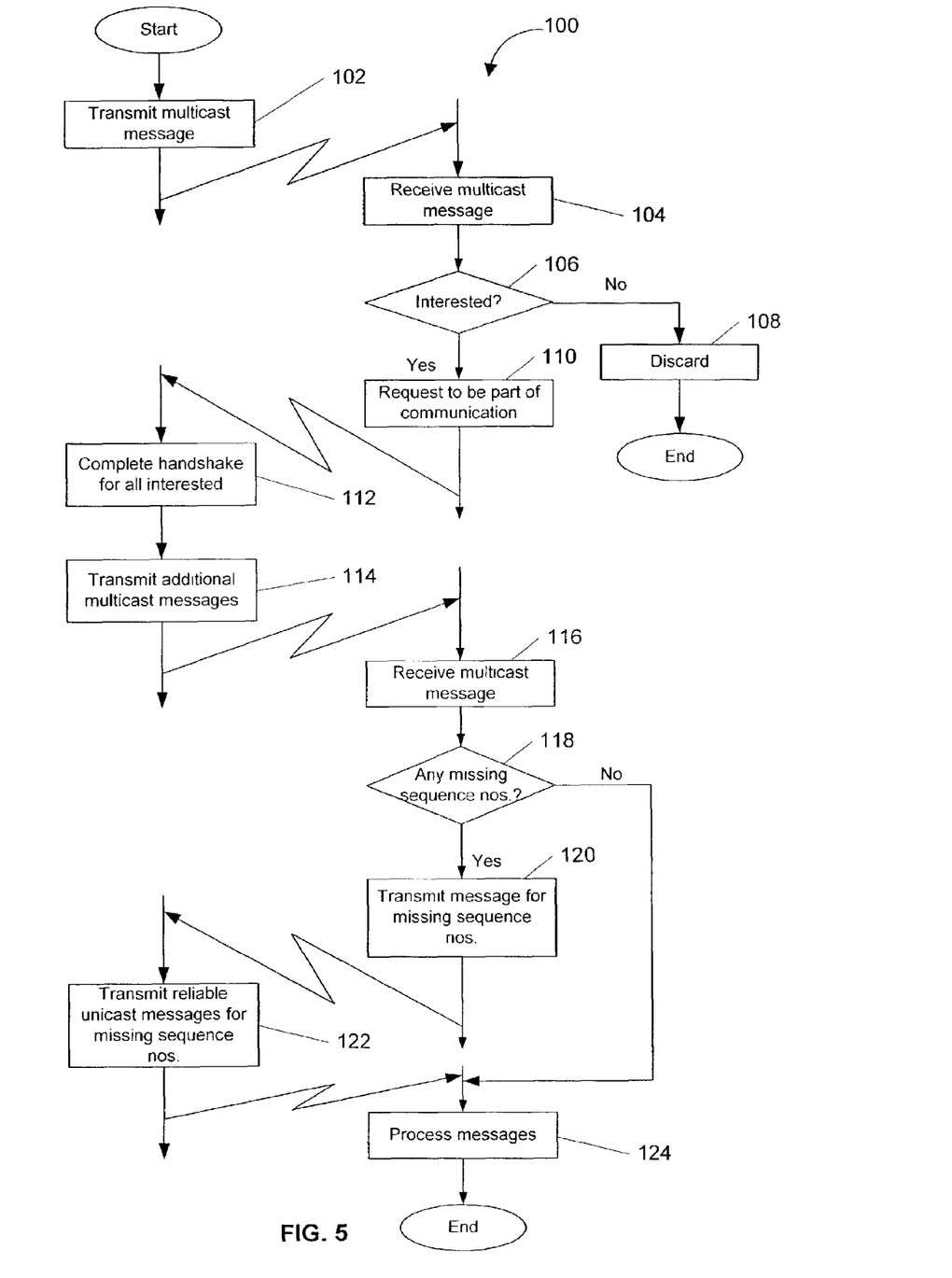
FIG. 5 is a flow diagram of a method for peer-to-peer messaging, according to an embodiment of the present invention.

FIG. 5 illustrates a method 100 for peer-to-peer messaging, according to an embodiment of the present invention. Method 100 can be performed by a client machine 12 acting as a sending computer and at least one client machine 12 acting as a recipient computer. Method 100 begins at step 102 where the sending machine transmits a multicast message. The multicast message may be related to a particular subject, which is specified in the body component of the message. The multicast message is intended for a select group of client machines on communication link 14.

At step 104 the multicast message may be received at one or more client machines 12. Each client machine 12 which receives a multicast message may at step 106 determine whether it is interested in (or subscribed to) the subject matter of the message. If it is not interested in the subject matter of that message, then the client machine 12 will discard the message at step 108, after which the method 100 ends for that particular receiving machine. Otherwise, if the receiving client machine 12 is interested, then at step 110 the machine requests to be part of the communication for that message.

At that point, the request is sent back to the original sending client machine 12, which completes a handshake for all interested recipient machines at step 112. At step 114 the sending client machine 114 then transmits additional multicast messages to the recipient machines via communication link 14. Each recipient client machine 12 which is part of the communication receives one or more of the additional multicast messages at step 116. Each such multicast message will have a sequence number which identifies where in the sequence of messages it falls.

At step 118 each recipient machine that is part of the communication determines whether it is missing any of the messages that are part of the communication. In one embodiment, this can be accomplished by looking at the sequence numbers of all of the received multicast messages and determining if any sequence numbers are missing. Thus, for example, for a sequence of messages that range from 91 through 110 in sequence number, the client machine 12 may determine that messages with sequence numbers of 98, 99, and 105 were not received. If there are no missing sequence numbers, then method 100 moves on to step 124 (described below). Otherwise, if there are missing sequence numbers, then at step 120 the recipient client machine transmits a message for the missing sequence numbers back to the sending machine.

At step 122, the original sender machine transmits in reliable unicast the messages corresponding to the missing sequence numbers for each receiving machine that has indicated that it did not receive at least some of the messages. Reliable unicast messages are directed at particular client machines rather than multicast throughout the system 10. When the messages are received at the individual recipient machines, they are processed at step 124. After that method 100 ends.

The lightweight peer-to-peer messaging according to embodiments of the present invention is optimized for communicating a large number of messages from one sender to many receivers. It offers significant advantages in terms of performance, reliability, configuration and bandwidth over previously developed techniques.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A system for on-line collaborative computing between a plurality of machines comprising:
    a first client machine operable to transmit a sequence of messages related to an online collaborative meeting, wherein transmission of each message can be in the form of multicast delivery or reliable unicast delivery; and
    at least one second client machine operable to communicate with the first client machine, each second client machine operable to receive at least a portion of the sequence of messages transmitted in multicast form of delivery from the first client machine, to determine if there is an interest in the online collaborative meeting of the sequence of messages, to determine if any messages in the sequence have not been received if there is an interest, and to transmit a request for re-transmission to the first client machine identifying any messages of the sequence that were not received so that such messages can be re-transmitted by the first client machine to the at least one second client machine in the form of reliable unicast delivery;
    wherein each of the first client machine and the second client machine comprises a messaging library for supporting the transmission of each message in the form of multicast delivery or reliable unicast delivery, and each messaging library is adapted to receive a request from the other client machine for re-transmission of messages that were not received by multicast delivery and to re-transmit the requested messages to the other client machine using reliable unicast delivery.

2. The system of claim 1 wherein the at least one second client machine subscribes to the online collaborative meeting of the sequences of messages.

3. The system of claim 2 wherein the first client machine comprises a receiver list for tracking the at least one second client machine which subscribes to the online collaborative meeting of the sequence of messages.

4. The system of claim 1 wherein each messaging library comprises:
    a message handling component operable to manage the handling of messages transmitted from the first client machine; and
    a delivery service component operable to control the transmission of messages for multicast delivery or reliable unicast delivery.

5. The system of claim 1 further comprising at least one application running on the first client machine and associated with the messaging library, wherein the message library serves as a transport layer between the at least one application and a network layer.

6. The system of claim 1 wherein each messaging library is operable to assign a respective sequence number to each message of the sequence.

7. The system of claim 1 wherein each messaging library comprises a ledge file for tracking information exchanged between the first client machine and the second client machine.

8. The system of claim 1 further comprising a local area network (LAN) connecting the first client machine to the at least one second client machine.

9. The system of claim 1 wherein the sequence of messages are related to application sharing for the online collaborative meeting.

10. The system of claim 1 wherein the sequence of messages are related to document sharing for the online collaborative meeting.

11. The system of claim 1 wherein the sequence of messages are related to telephone conferencing for the online collaborative meeting.

12. The system of claim 1, further comprising a plurality of third client machines, wherein each of the third client machines provides a service for supporting the online collaborative meeting and each of the third client machines is operable to transmit messages to other third client machines in the form of multicast delivery.

13. A system for online computing between a plurality of machines comprising:
    a communication link;
    a sending client machine coupled to the communication link and operable to transmit over the communication link a sequence of messages related to an online collaborative meeting; and
    a plurality of recipient machines coupled to the communication link and operable to communicate with the first client machine, each recipient client machine operable to receive at least a portion of the sequence of messages transmitted from the sending client machine, to determine if there is an interest in the online collaborative meeting of the sequence of messages, to determine if any messages in the sequence have not been received if there is an interest, and to transmit a request for re-transmission to the sending client machine identifying any messages of the sequence that were not received so that such messages can be re-transmitted by the seconding client machine to that recipient client machine;
    wherein the sending client machine and the recipient client machines each comprise a respective messaging library, each messaging library implementing a delivery protocol having a multicast form of delivery, a unicast form of delivery, and a reliable unicast form of delivery, and each messaging library is adapted to receive a request from one of the other client machines for re-transmission of messages that were not received by multicast delivery and to re-transmit the requested messages using reliable unicast delivery.

14. The system of claim 13 wherein in the multicast form of delivery a message is provided for a selection group of the recipient client machines.

15. The system of claim 13 wherein in the reliable unicast form of delivery a message is provided to a specific one of the recipient client machines and an acknowledgement procedure is used to ensure delivery.

16. The system of claim 13 wherein the messaging library is operable to assign a respective sequence number to each message of the sequence.

17. The system of claim 13 wherein neither the first client machine nor the second client machine comprise a message daemon and wherein the system does not comprise a messaging server for communicating the sequence of messages between the sending client machine and the recipient client machines.

18. The system of claim 13 wherein the messaging library comprises a ledge file for tracking information exchanged between the sending client machine and at least one of the recipient client machines.

* * * * *